F. W. BARTLETT.
Ozone Apparatus.
No. 219,378.    Patented Sept. 9, 1879.
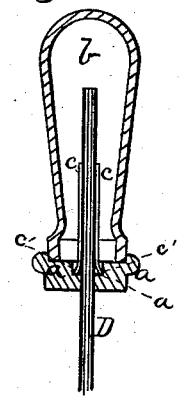
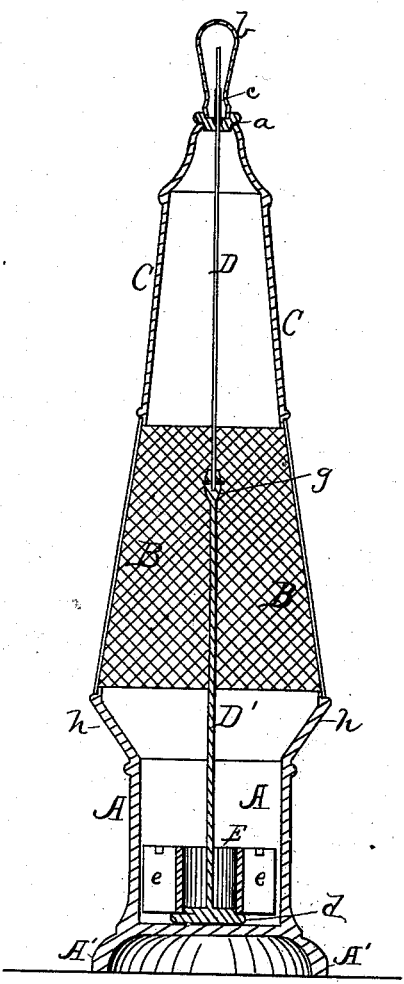
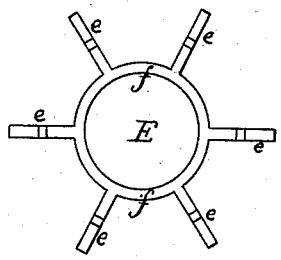
F. W. Bartlett,
Inventor,
by J. R. Drake,
Atty.
Witnesses:
T. H. Parsons.
J. R. Drake.

UNITED STATES PATENT OFFICE.

FREDERICK W. BARTLETT, OF BUFFALO, NEW YORK.

IMPROVEMENT IN OZONE APPARATUS.

Specification forming part of Letters Patent No. 219,378, dated September 9, 1879; application filed June 26, 1878.

*To all whom it may concern:*

Be it known that I, FREDERICK W. BARTLETT, M. D., of Buffalo, in the county of Erie and State of New York, have made certain Improvements in Ozone Apparatus, of which the following is a specification.

This is an improvement on my patent of February 15, 1876, and the improvements are fully hereinafter described and claimed.

In the drawings, Figure 1 is a vertical section through the center; Fig. 2, plan of the glass-holder; Fig. 3, detail of stopper, collar, clasp, and rod.

A represents the base; B, the ozone separating and eliminating chamber; and C, the dome or expansion-chamber, made, preferably, of glass, and the sides slanting outward gradually from the top downward to the point of junction with the ozone-chamber B. This outward slant is very important in this connection, as it involves a chemical principle, such walls slightly inclined outward from above downward being kept free from phosphoric oxides or acids, therefore free from corrosion. When vertical walls are used they soon become cloudy and covered with a vapor, which, if the material will admit, becomes oxidized thereon.

The top of the dome or chamber is partly closed by a glass collar, $a$, which sits in the mouth of the dome. It is hollow, to allow the rod D to pass through it and into the hollow glass stopper $b$. Around the rod, above the collar $a$, is a metal spring-clasp, $c$, with a flange or rim, $c'$, formed on the bottom thereof, and which sits on a shoulder, $a'$, formed in the glass collar $a$. This holds up the connecting-rod D, attached to the phophorus-holder platform at any suitable point, so as to regulate the oxidations of the phosphorus, and keep the sticks or pieces at a proper height above the surface of the water; or, by sliding the clasp $c$ upward, the phosphorus-holder is lowered into the water, carrying the phosphorus below the surface, and thereby suspending oxidation. The glass stopper, being hollow, allows the rod free play up and down therein. The upper part of the connecting-rod D is made of glass to avoid corrosion, and it is jointed about midway in the ozone-chamber, for convenience in taking the apparatus apart and preventing breaking of the rod.

The glass rod D and wooden rod D' are jointed or hinged substantially as follows: The end of the wooden rod D' is formed with a projecting pin or point, $g$, that penetrates into a hollow wooden coupling on the extreme end of the glass rod D, the edge of the latter being enlarged to retain the coupling thereon. A pin goes longitudinally through the coupling and the point $g$ of the lower rod, D', and holds both. At the joint $g$ it unites to a wooden rod, D', which supports the independent glass phosphorus-holder E on a wooden platform, $d$, at the lower end. This presents several advantages. It allows the phosphorus-holder E to be removed to be charged with new phosphorus or for other reasons; it limits the liability to breakage, is non-corrosive, cheap, and easily replaced if damaged.

The glass holder E is constructed with a central ring or circular wall, $f$, through which the rod D' of the platform passes, and has several radial arms or upright partitions, $e\ e\ e\ e$, formed thereon and extending outward, the circumference of the whole being nearly that of the inside of the base A. These partitions (see Fig. 2) prevent any contact of the phosphorus sticks, and permit the hanging, setting, or suspension of said sticks in any suitable way between said partitions.

The base A is of glass, as in my former patent, but broadened outward at the bottom, so as to form a firm base proper, A', which dispenses with feet of any sort. Also, the upper part, $h$, of the walls projects outward gradually till they meet the base of the porous walls of the ozone-chamber B. This gives the important advantage of a greater outward circumference to said chamber at the bottom, thereby permitting a greater lateral spreading of its walls from the apex downward for the same reasons as the spreading of the dome C.

The operation of the apparatus is as follows: The pieces of phosphorus are set in the glass holder, or suspended therefrom, water being introduced into the base until about one-half an inch above the tops of the phosphorus, the wooden platform resting on the bottom of the base. To start the generating of ozone, the glass stopper is lifted off the top, the end of the glass rod is then taken hold of, and by it the platform and phosphorus raised sufficiently to expose the tops of the latter about one-fourth of an inch above the water for slow combustion, the collar or clasp holding the rod at the height desired, and allowing the rod to be raised still farther as the phosphorus slowly burns down, so as to keep the sticks at a proper height above the water-level for their slow oxidation. The hollow glass stopper is put over the end of the rod, as an ornament and to aid in keeping the top air-tight.

The fumes of the phosphorus rise into the chamber above it, said fumes containing ozone and phosphorous acid, which after a time will separate to a certain extent, and the ozone will pass out through the porous walls of the eliminating-chamber. The simultaneous expulsion of the phosphorous acid is wholly prevented by the chemically-prepared porous materials contained in the walls of the eliminating-chamber and falls into the water beneath. The rod used for elevating the phosphorus is also used for submerging it. When this is done formation of ozone ceases.

In large apparatus for hospitals or other extensive establishments or places this base will have an opening above the water-line at the side, in order to readily introduce the water necessarily used for submersion of the phosphorus, or to withdraw the same to expose the phosphorus while generating ozone.

In such apparatus the phosphorus-holder will be greatly enlarged with a sufficient number of sections, tubes, or partitions, so that the amount of phosphorus used will be adapted to the size of the apparatus. This phosphorus-holder will not necessarily be raised and lowered, as in the smaller devices, like the one described, but will rest on the bottom of the base A. The height of the phosphorus sticks and their oxidation may be entirely regulated by the increase or decrease of the water in the base, and operated upon from the outside through the opening above described.

I claim—

In an ozone apparatus, the combination, with the cylindrical chamber having flaring extensions, of the phosphorus-holder E $f$ $e$, jointed rod D D', clasp $c$, and external stopper, $b$, substantially as specified.

In witness whereof I have hereunto signed my name in the presence of two subscribing witnesses.

F. W. BARTLETT.

Witnesses:
 J. R. DRAKE,
 T. H. PARSONS.